United States Patent [19]
Rich

[11] 3,806,258
[45] Apr. 23, 1974

[54] ABSORPTIOMETERS

[75] Inventor: Colin Vestey Rich, Tonbridge, England

[73] Assignee: Tate & Lyle Limited, London, England

[22] Filed: Feb. 15, 1972

[21] Appl. No.: 226,470

[30] Foreign Application Priority Data
Feb. 18, 1971  Great Britain..................... 4965/71

[52] U.S. Cl................. 356/226, 356/231, 250/573, 250/217 R
[51] Int. Cl. ............................................ G01j 1/44
[58] Field of Search ............ 356/226, 231; 250/205, 250/217 R

[56] References Cited
UNITED STATES PATENTS
3,437,822  4/1969  Fitzsimmons .................. 250/205 X
3,393,604  7/1968  Lundin ....................... 250/217 R X Primary Examiner—Ronald L. Wibert
Assistant Examiner—Paul K. Godwin
Attorney, Agent, or Firm—Ostrolenk, Faber, Gerb & Soffen

[57] ABSTRACT

An absorptiometer in which a lamp source is arranged to direct radiation onto a radiation-sensitive device, means being provided for measuring an electrical output from the device and thereby deriving a measure of the optical density of a sample when located in the path between the source and the device, wherein for initial setting purposes, when a standard sample is located in the said path, means are provided for automatically varying the energization of the lamp source until the output of the radiation-sensitive device is set to a pre-determined value, and wherein, for subsequent measurement purposes, means are provided for maintaining the energization of the lamp source at the previously set value.

6 Claims, 1 Drawing Figure

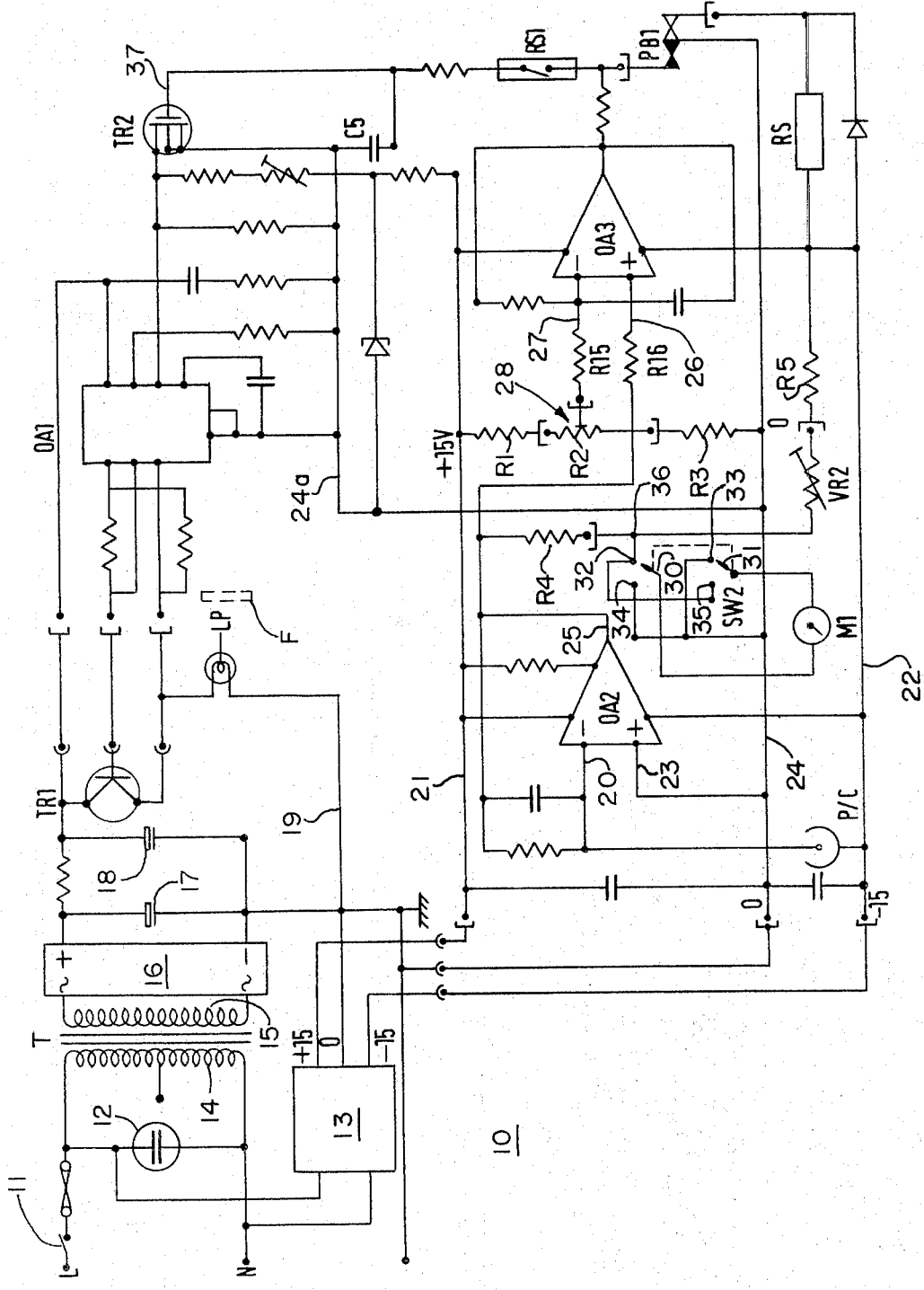

ABSORPTIOMETERS

This invention relates to absorptiometers for the purpose of measuring the optical density of a medium.

It is an object of the present invention to provide an improved absorptiometer of relatively simple construction which may be employed readily and easily to perform measurements of the optical density of samples.

The present invention consists in an absorptiometer in which a lamp source is arranged to direct radiation onto a radiation-sensitive device, means being provided for measuring an electrical output from the device and thereby deriving a measure of the optical density of a sample when located in the path between the source and device, wherein for initial setting purposes, when a standard sample is located in the said path, means are provided for automatically varying the energization of the lamp source until the output of the radiation-sensitive device is set to a pre-determined value, and wherein, for subsequent measurement purposes, means are provided for maintaining the energization of the lamp source at the previously set value.

In carrying the invention into effect according to one convenient mode by way of example, the accompanying drawing shows the circuit diagram of a direct reading single cell absorptiometer designed principally for use in the sugar industry for measuring the optical density of sugar liquors.

The circuit 10 of the present invention comprises a pair of terminals L and N coupled to a suitable source of a.c. energy (not shown for purposes of simplicity). Switch means 11 is provided for selectively coupling the circuit to the energy source. A lamp 12 is provided across the source terminals and is adapted to glow when switch 11 is closed to indicate that the circuit has been energized. The closure of switch 11 further energizes a power supply 13 for providing specific d.c. power levels as shown at the out-put terminals. A transformer P is provided having its primary windings 14 coupled to the energizing source when switch 11 is closed. The transformer secondary 15 is coupled to a full wave bridge rectifier 16 and filter circuit comprised of capacitors 17 and 18 for powering transistor TR1 and operational amplifier OA1.

The circuit includes a lamp source LP arranged by means of a lens system to direct a beam of radiation through a sample contained in a cell (not shown) onto a photo-cell P/C. One terminal of lamp LP is coupled to the zero volt line 19, while the remaining terminal is coupled to one electrode of transistor TR1. A narrow band interference filter F is located between the sample and the photo-cell to permit measurements to be made at a single wavelength of 420 millimicrons.

The sample cell is held in a holder (not shown for purposes of simplicity) which will accept cells having a length of between 0.5 cms and 16.3 cms thereby permitting measurements to be made on all liquors encountered in sugar refining. The larger cells also allow accurate measurements to be made on dissolved granulated sugars.

The output of the photo-cell P/C is fed to input terminal 20 of a voltage follower circuit constituted by an operational amplifier OA2 connected as a current-to-voltage converter. Converter OA2 is coupled between the +15 volt line 21, the −15 volt line 22 and has its remaining input terminal 23 coupled to ground or reference potential line 24. The output of the current-to-voltage converter circuit is fed via resistor R16 to input 26 of an operational amplifier OA3 connected as a voltage comparator, where it is compared with a reference voltage fed via resistor R15. One terminal of resistor R15 is coupled to input terminal 27 of operational amplifier OA3. The opposite input terminal is coupled to a slider arm 28 of a potential divider comprised of resistors $R_1$, $R_2$, and $R_3$, which are connected in series between the +15 volt line 21 and the zero reference line 24. By adjustment of slider 28 the level applied to the input 27 of operational amplifier OA3 can be regulated.

When switch PB1 is operated, a coil of a reed switch RS is energised and its contacts RS1 are closed causing the output of voltage comparator OA3 to be applied to a capacitor C5 and to the gate of a MOST, (Metal-Oxide Silicon Transistor) TR2 causing the drain-source resistance of TR2 to be varied to vary the energization and intensity of lamp LP, (via operational amplifier OA1 and transistor TR) until such time as the circuit is in a stable balanced condition. The closing of switch PB1 further establishes a feedback path through the reed switch coil RS, resistor R5, adjustable resistor $R_s$, adjustable resistor VR2, to one terminal of resistor $R_4$ with the common terminal between resistors $R_4$ and VR2 being connectible to one terminal of meter M1 through a polarity reversing switch SW2. With switch SW2 in the solid line position as shown in the FIGURE so that its movable arms 30 and 31 engage contacts 32 and 33, respectively, meter M1 can be seen to be coupled between the common terminal 36 and the ground reference line 24. By reversal of switch SW2 so that its movable arms 31 and 30 engage stationary contacts 34 and 35 the polarities of the metered terminals are reversed.

Adjustable resistor VR2 may be adjusted so that in this balanced condition, the meter M1 reads full scale deflection (F.S.D.).

Capacitor C5 can be seen to be connected between zero reference potential line 24 (by means of lead 24a) and the control electrode 37 of transistor TR2. The voltage stored across capacitor C5 can be seen to be a function of the full scale deflection.

When switch PB1 is released, thereby allowing contacts RS1 to open, the meter will remain set to F.S.D. by the action of capacitor C5 upon the MOS transistor TR2 upon the MOS transistor TR2 by virtue of the fact that transistor TR2 has a high input impedance preventing capacitor C5 from discharging.

This setting up procedure is carried out while a standard reference cell in the form of a water cell or glass block is located in the cell holder.

When the standard cell has been removed, sample cells may be inserted in the holder, causing the output from the photo-cell to fall, and direct readings taken from the meter M1 as soon as each sample is in position.

It will be apparent that one advantage of the apparatus described above is that variations in the components, such as ageing of the photo-cell, do not affect the accuracy of the measurements made, since such variations are automatically compensated during switching of the meter to full scale deflection.

I claim:

1. An absorptiometer for measuring the optical density of a sample comprising:

a lamp source for directing radiation upon said sample;

a radiation-sensitive device for generating an output whose level is a function of the optical density of a sample positioned between the lamp source and the radiation-sensitive device wherein, for initial setting purposes, when a standard sample is located in the path between the lamp source and the radiation-sensitive device, means coupled to said radiation-sensitive device automatically varies the energization of the lamp source until the output of the radiation-sensitive device is set to a predetermined value, said means for varying the energization of the lamp source further comprising means for maintaining the energization of the lamp source at the previously set value; and a narrow-band interference filter positioned between the lamp source and the sample.

2. The device of claim 1 wherein the means for automatically varying the energization of the lamp source further includes circuit means for controlling the energization of the lamp source;

reference voltage level means and a comparator for comparing the level of the reference voltage level means against the output of the radiation-sensitive device for providing an output depending upon the difference between the output of the radiation-sensitive device and the reference voltage level means.

3. The device of claim 2 further comprising means coupled between the output of the radiation-sensitive device and said comparator means for converting the current output of the radiation-sensitive device to a voltage level representative of the current output of the radiation-sensitive device.

4. The device of claim 2 wherein the circuit for controlling the energization of the lamp source includes a metal oxide silicon transistor and an operational amplifier coupled between the output of the transistor and the lamp source;

the input of the transistor being coupled to the output of the comparator means.

5. The device of claim 2 wherein the means for maintaining the energization of the lamp source at the previously set value includes capacitor means;

switch means coupled between the output of the comparator and the capacitor means and adapted to be in the closed position to charge the capacitor to the value of the output of the comparator during the initial setting period and being movable to a disconnected position for controlling the energization of the lamp source after completing the initial setting procedure, wherein the capacitor is adapted to maintain the controlling circuit by virtue of the charge stored by the capacitor thereby maintaining the lamp source at a set output value.

6. The device of claim 2 further comprising a feedback path coupled between the comparator means and the output of the radiation-sensitive device;

meter means coupled to a common terminal between the feedback path and the output of the radiation-sensitive device to provide a reading representative of the optical density of the sample positioned between the lamp source and the radiation-sensitive device;

adjustable impedance means coupled in said feedback path for adjusting the meter means to a predetermined reading.

* * * * *